United States Patent
Fendt et al.

(10) Patent No.: US 10,435,029 B2
(45) Date of Patent: Oct. 8, 2019

(54) ENVIRONMENT DETECTION DEVICE AND VEHICLE WITH SUCH AN ENVIRONMENT DETECTION DEVICE

(71) Applicant: Conti Temic microelectronic GmbH, Nürnberg (DE)

(72) Inventors: Günter Anton Fendt, Schrobenhausen (DE); Konrad Rothenhäusler, Achberg (DE); Manfred Gantner, Lindau (DE); Dieter Krökel, Eriskirch (DE)

(73) Assignee: CONTI TEMIC MICROELECTRONIC GMBH, Nürnberg (DE)

( * ) Notice: Subject to any disclaimer, the term of this patent is extended or adjusted under 35 U.S.C. 154(b) by 89 days.

(21) Appl. No.: 15/618,810

(22) Filed: Jun. 9, 2017

(65) Prior Publication Data

US 2017/0355380 A1    Dec. 14, 2017

(30) Foreign Application Priority Data

Jun. 9, 2016    (DE) .......................... 10 2016 210 209

(51) Int. Cl.
*B60W 50/02*    (2012.01)
*G08G 1/16*    (2006.01)
(Continued)

(52) U.S. Cl.
CPC .... *B60W 50/0205* (2013.01); *B60W 50/0225* (2013.01); *B60W 50/038* (2013.01);
(Continued)

(58) Field of Classification Search
CPC ............. B60W 50/0205; B60W 50/14; B60W 50/0225; B60W 50/038; B60W 2050/0215; B60W 2400/00; B60W 2420/42; G08G 1/167; G08G 1/166; G08G 1/09623; G06F 1/206; G01K 13/00; Y02D 10/16
(Continued)

(56) References Cited

U.S. PATENT DOCUMENTS 8,115,809 B2 *    2/2012    Taniguchi ................. B60R 1/00
                                                        348/148
8,666,221 B2 *    3/2014    Okazaki ................. H04N 5/772
                                                        386/224
(Continued)

FOREIGN PATENT DOCUMENTS

DE    102007043516 A1    3/2009
DE    112010004671        1/2013
(Continued)

OTHER PUBLICATIONS

German Search Report dated Dec. 21, 2016 for corresponding German Patent Application No. 10 2016 210 209.5.

*Primary Examiner* — Jaime Figueroa

(57) ABSTRACT

An environment detection device for a vehicle is includes a sensor unit for determining environment information of a surrounding area of the vehicle itself, with a temperature measurement unit, configured to measure at least one state temperature of the sensor unit, and with a controller, configured to trigger at least one action for reducing the state temperature if a prescribed temperature warning value is exceeded.

10 Claims, 3 Drawing Sheets

(51) Int. Cl.
  *B60W 50/038* (2012.01)
  *B60W 50/14* (2012.01)
  *G01K 13/00* (2006.01)
  *G06F 1/20* (2006.01)
  *G08G 1/0962* (2006.01)

(52) U.S. Cl.
  CPC ............ *B60W 50/14* (2013.01); *G01K 13/00* (2013.01); *G06F 1/206* (2013.01); *G08G 1/167* (2013.01); *B60W 2050/0215* (2013.01); *B60W 2400/00* (2013.01); *B60W 2420/42* (2013.01); *G08G 1/09623* (2013.01); *G08G 1/166* (2013.01); *Y02D 10/16* (2018.01)

(58) Field of Classification Search
  USPC ....................................................... 701/1, 23
  See application file for complete search history.

(56) References Cited

U.S. PATENT DOCUMENTS

| | | | | |
|---|---|---|---|---|
| 9,762,810 | B2* | 9/2017 | Conneely | B60R 1/002 |
| 2006/0115120 | A1* | 6/2006 | Taniguchi | B60R 1/00 |
| | | | | 382/104 |
| 2010/0060738 | A1* | 3/2010 | Kataoka | G06K 9/209 |
| | | | | 348/148 |
| 2011/0001640 | A1* | 1/2011 | Kageyama | B60W 50/14 |
| | | | | 340/995.24 |
| 2012/0189265 | A1* | 7/2012 | Okazaki | H04N 5/772 |
| | | | | 386/227 |
| 2012/0293657 | A1* | 11/2012 | Kataoka | G06K 9/209 |
| | | | | 348/148 |
| 2015/0138359 | A1* | 5/2015 | Masui | B60R 1/00 |
| | | | | 348/148 |
| 2016/0039414 | A1* | 2/2016 | Kawai | H04N 5/3698 |
| | | | | 701/28 |
| 2016/0068160 | A1† | 3/2016 | Schofield et al. | |
| 2016/0137192 | A1* | 5/2016 | Wu | B60W 20/50 |
| | | | | 701/22 |
| 2017/0176584 | A1* | 6/2017 | Schoor | G01S 13/42 |
| 2017/0240138 | A1* | 8/2017 | Mori | B60J 1/002 |
| 2017/0295339 | A1† | 10/2017 | Ibaraki et al. | |

FOREIGN PATENT DOCUMENTS

| | | |
|---|---|---|
| DE | 102013015410 A1 | 3/2015 |
| DE | 112013002203 | 4/2015 |
| DE | 102014208666 A1 | 11/2015 |

\* cited by examiner
† cited by third party

ENVIRONMENT DETECTION DEVICE AND VEHICLE WITH SUCH AN ENVIRONMENT DETECTION DEVICE

CROSS REFERENCE TO RELATED APPLICATION

This application claims the benefit of German Application DE 10 2016 210 209.5, filed Jun. 9, 2016, which is incorporated herein by reference.

TECHNICAL FIELD

The technical field relates generally to an environment detection device for a vehicle.

BACKGROUND

Environment detection systems such as cameras with image processing are used, inter alia, in vehicles equipped with at least one driver assistance device such as lane assist, traffic light recognition, traffic sign recognition, collision warning or pedestrian detection. Environment detection systems are also essential in autonomous vehicle guidance. The functioning of such environment detection systems is therefore crucial in ensuring the safety and comfort gains delivered to the vehicle driver by the driver assistance device.

In particular, the data processing performed by such environment detection systems, particularly during prolonged or permanent operation, can lead to critical self-heating. Furthermore, vehicle front cameras which are normally arranged in the interior space of the vehicle behind the wind shield are particularly subject to intense heating from sunlight. To prevent thermal damage in this way to the environment detection system, the system is normally shut down upon exceeding a defined temperature threshold. This necessarily results in the deactivation of the autonomous driving mode or driver assistance device.

As such, it is desirable to provide an environment detection device, which ensures reliable sensor data for driver assistance devices working on the basis thereof.

SUMMARY

In one exemplary embodiment, an environment detection device for a vehicle includes a sensor unit for determining environment information of a surrounding area, particularly a surrounding area ahead of the vehicle itself. The vehicle itself particularly means a vehicle with the integrated environment detection device. The environment detection device may be arranged in the interior space and in the direction of travel of the vehicle.

By way of example, the sensor unit has a radar or lidar unit or is configured as such. Alternatively, or optionally in addition, the sensor unit comprises an imaging unit with at least one optical system for projecting light and at least one image sensor such as a CMOS sensor for detecting the light projected by the optical system or is configured as such.

In one embodiment, the sensor unit includes an evaluation unit, configured to interpret environment information such as, for example, lane markings from the sensor data transmitted by the lidar, radar, and/or imaging unit for implementation of at least one driver assistance device and/or for autonomous vehicle guidance.

Furthermore, the sensor unit may include at least one driver assistance device to assist the vehicle driver of the vehicle itself by means of the environment information interpreted by the evaluation unit. The at least one driver assistance device relates, by way of example, to a lane assist, traffic light recognition, traffic sign recognition, collision warning, pedestrian detection, brake assist, or autonomous vehicle guidance.

In one embodiment, the environment detection device has a temperature measurement unit, configured to measure at least or precisely one state temperature of the sensor unit. Here, the state temperature particularly means a component temperature of at least one component that the sensor unit comprises, for example, the actual temperature of the image sensor and/or an ambient temperature of the sensor unit, especially the ambient temperature of the image sensor. The ambient temperature can, by way of example, be an actual temperature measured in the housing of the sensor unit.

The environment detection device may include a controller. The controller may be configured to shut down the sensor unit, especially the image sensor and/or the evaluation unit, if a prescribed thermal shutdown threshold is exceeded by the at least one state temperature measured by the temperature measurement unit. This is intended to protect the sensor unit from overheating.

According to one exemplary embodiment, the controller is configured to trigger at least one action to reduce the state temperature when a prescribed temperature warning value is exceeded. In other words, upon reaching the temperature warning value a preventive measure is triggered by the controller in order to prevent an upward temperature progression or at least to attenuate this and thereby prevent exceeding of the thermal shutdown threshold. This allows a shutdown process of the sensor unit due to inherent heating to be avoided or at least delayed and the sensor data necessary for the driver assistance functions are consequently ensured for as long as possible. The intention is that in this way high availability of safety-relevant driver assistance devices can be achieved.

The controller, in order to reduce the state temperature, may be configured to reduce the output of the sensor unit or at least of electronic sub-assemblies of the sensor unit such as, for example, the evaluation unit.

The controller may be configured to shut down the at least one triggered action, especially the reduction in power, if the temperature warning value is undershot by the measured state temperature.

The interpretation of the environment information by the evaluation unit takes place, by way of example, within a processing cycle with a specific time interval. The processing cycle particularly means the sum of a data processing and an idle time. During the data processing time the environment information, for example, are interpreted by the evaluation unit, whereas during the idle time the evaluation unit is idle. It is disadvantageous that the evaluation unit requires approximately the same output during data processing and when idling and so the thermal power associated with the idling is also present. In light of this, the controller may be configured, in order to reduce the state temperature, to shut down the evaluation unit during the idle time of at least one processing cycle. The evaluation unit may be shut down in the idle time, if the time required for a shutdown, saving and switch-on procedure is less than the idle time. To determine the current idle time, for example the idle time of at least one of the last processing cycles performed is evaluated. In this way, the power consumption and the associated temperature progression can be reduced without losing the interpretation of the environment information.

As a further action that may be triggered, the controller is particularly configured, in order to reduce the state temperature, to reduce an image resolution, a field of view to be interpreted and/or an image recording rate of the at least one image to be recorded, by way of example to halve this. If the sensor unit comprises the radar unit, the resolution of the radar unit may be reduced. In this way, a reduction in the computing effort and therefore the self-heating of the image sensor or of the radar unit is achieved. Furthermore, in this way particularly the data processing time of the evaluation unit falls so that thermal energy is also saved by shutting down the evaluation unit in the prolonged idle time. Despite an associated lower ability to interpret particularly environment information that is far away, a multitude of environment information can still be interpreted and accordingly driver assistance devices or autonomous vehicle guidance using these can still be implemented albeit with restrictions. In particular, a sudden total loss of all available driver assistance devices can be advantageously prevented.

In a further action that may be triggered, the controller is configured, in order to reduce the state temperature, to deactivate the at least one or at least one of the driver assistance device(s), if the temperature warning value is exceeded by the measured state temperature. Thus, the interpretation of the environment information necessary for the at least one deactivated driver assistance is shut down. The additional idle time gained here accordingly saves further thermal energy when the evaluation unit is shut down.

In the case of at least two driver assistance devices, the controller is preferably configured to carry out the deactivation of the at least one driver assistance device in stages according to a set safety relevance. Thus, a first temperature warning value in particular is provided, which if exceeded results in the shutting down of a driver assistance device with the lowest safety level or the driver assistance devices with equal safety levels. In the event of exceeding a second temperature warning value, at least one driver assistance device with the next-highest safety level is shut down. In other words, particularly, a staged shutdown of the driver assistance devices takes place as a function of their contribution to traffic safety. By way of example, in the case of pedestrian and traffic sign recognition, the traffic sign recognition will be shut down first, since pedestrian recognition makes a significant contribution to active vehicle safety.

In a further action that may be triggered, the controller is particularly configured, in order to reduce the state temperature, to switch the evaluation unit to a simplified evaluation mode for interpretation of the environment information. By way of example, the evaluation unit is configured in the simplified evaluation mode to interpret a limited image area of the field of view of the at least one recorded image. Purely by way of example, it is worth mentioning here the interpretation of traffic signs for the traffic sign detection, during which the evaluation unit in the simplified evaluation mode, by way of example, interprets the patterns in the limited image area comparatively to a normal evaluation mode. Alternatively, or optionally in addition, the evaluation unit is configured in the simplified evaluation mode, to simplify the search criteria for interpretation of the environment information, thus, for example, to interpret a reduced number of patterns.

In a further exemplary embodiment, the controller is configured, in the case of at least one of the actions triggered for reducing the state temperature to trigger a permissible vehicle maximum speed, i.e., a speed limitation of the vehicle itself. Limiting the vehicle speed allows, despite the at least one triggered action such as the simplified evaluation mode or the reduced image resolution, a multitude of environment information to be interpreted.

In one exemplary embodiment, the environment detection device comprises a system-on-chip, wherein the image sensor of the imaging unit, the evaluation unit, the at least one driver assistance device, and/or the controller are arranged on the system-on-chip, in particular as electronic sub-assemblies.

A further subject relates to a vehicle with the environment detection device according to the above description. The controller may be configured, in the event of exceeding a prescribed temperature warning message level, to inform the vehicle driver of the vehicle itself of the possibility of an impending shutdown process of the environment detection device, of the possibility of an impending deactivation of at least one driver assistance device or the autonomous vehicle operation and/or of the possibility of an impending triggering of a speed limitation. By way of example, the vehicle driver is informed via an optical and/or acoustic warning message. The temperature warning level is, by way of example, the temperature warning value. In this way, the vehicle driver is informed in good time, e.g. of a possible impending driving requirement, so that a shock effect is avoided. This is a particular advantage if the exceeding of the thermal shutdown threshold cannot be avoided by the at least one triggered action and thus the deactivation of the autonomous driving mode or the operation of at least one driver assistance device.

In one exemplary embodiment, a method with an environment detection device, particularly for temperature-dependent control of the sensor unit according to the above description, is disclosed. In a first step, environment information on a surrounding area of the vehicle itself is detected. The environment information preferably relates to objects to be detected for the implementation of the at least one driver assistance device, thus, for example, lane markings for a lane assist. Furthermore, at least one state temperature of the sensor unit is measured by the temperature measurement unit. To determine the current state temperature, by way of example, a regular temperature measurement takes place with a frequency of 2 seconds. In the event of the prescribed temperature warning value being exceeded by at least one state temperature measured by the temperature measurement unit, at least one action for reducing the state temperature is triggered by the controller.

With the at least one action to be triggered, the output of the sensor unit or of electronic subassemblies of the sensor unit, such as the evaluation unit or the image, is reduced. Alternatively, or optionally in addition, if the evaluation unit is shut down in the idle time, the time required for a shutdown, saving and switch-on procedure should be less than, by way of example, the idle time of the last processing cycle performed. As a further alternative or optional addition, the image resolution, the field of view and/or the image recording rate are reduced. As a further action to be triggered, the at least one driver assistance device is deactivated to prolong the idle time. In the case of at least two driver assistance devices the driver assistance devices may be deactivated in stages according to set safety requirements. In a further action, the evaluation unit may be switched to a simplified evaluation mode in order to reduce the state temperature.

BRIEF DESCRIPTION OF THE DRAWINGS

Further features, advantages and effects of the disclosure are indicated by the following description of exemplary embodiments. These show as follows.

DETAILED DESCRIPTION

Figure 1:
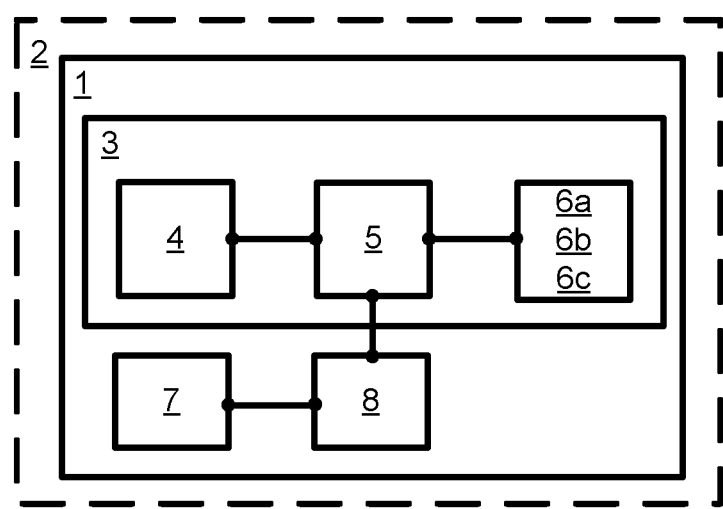
FIG. 1 is block diagram of an environment detection device including a sensor unit.

Corresponding parts are shown in all figures with the same reference numerals in each case.

FIG. 1 is a schematic block diagram of an environment detection device 1, integrated into a vehicle 2 such as, for example, an automobile, truck or agricultural machine.

The environment detection device 1 includes a sensor unit 3 for determining environment information of a surrounding area of the vehicle itself 2. The sensor unit 3 has, for example, an imaging unit 4 such as a mono or stereo camera, which is configured to detect at least one image of the surrounding area of the vehicle itself 2 for determining the environment information. Furthermore, the sensor unit 3 comprises, for example, an evaluation unit 5, which is particularly configured to interpret the environment information from the at least one image detected by the imaging unit 4.

By way of example, the environment detection device 1 comprises at least one driver assistance device 6a, 6b, 6c, e.g. pedestrian protection or a lane assistant, which particularly on the basis of the environment information interpreted by the evaluation unit 5 implements the driver assistant functions, thus for example a brake, warning or steering assist.

The environment detection device 1 comprises a temperature measurement unit 7, configured to measure at least one state temperature T1 of the sensor unit 3. The temperature measurement unit 7 is, by way of example, a temperature sensor integrated into a housing of the sensor unit 3 and/or into an image sensor of the imaging unit 4. Temperature monitoring of the sensor unit 3 in particular is performed by means of the at least one measured state temperature T1.

The environment detection device 1 has a controller 8. The controller 8 is preferably configured to shut down the sensor unit 3, especially the imaging unit 4, should a thermal shutdown threshold T3 particularly specified by the controller 8 be exceeded by the measured state temperature T1. The intention is that heat damage to the sensor unit 3, especially the imaging unit 4, is avoided by the shutdown process.

By the shutdown process of the sensor unit 3, the at least one driver assistance device 6a, 6b, 6c and accordingly the associated help to the vehicle driver is also shut down. The shutdown process, particularly in partially- or highly-automated operation, requires a sudden takeover action from the vehicle driver.

The controller 8 is configured to trigger at least one action to reduce the state temperature T1, if a temperature warning value T2 particularly specified by the controller 8 is exceeded by the measured state temperature T1. Particularly preferably, in order to reduce the state temperature T1, a temperature-dependent control of the output of the sensor unit 3 takes place. The intention is to in this way avoid a shutdown process of the sensor unit 3 associated with exceeding the thermal shutdown threshold T3 and consequently to ensure the implementation of the at least one driver assistance device 6a, 6b, 6c or of the autonomous driving mode.

Figure 2:
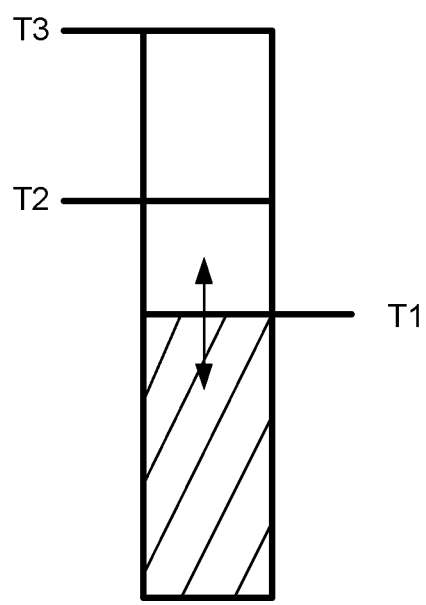
FIG. 2 is a histogram with the temperature state of the sensor unit and two of the temperature limiting values prescribed for the sensor unit for preventive avoidance of the danger of overheating of the sensor unit.

FIG. 2 shows a histogram of the current measured state temperature T1, the prescribed temperature warning value T2 and the prescribed thermal shutdown threshold T3. In this example the state temperature T1 is below the prescribed temperature warning value T2. The controller 8 is particularly configured, in the event of exceeding the temperature warning value T2, to trigger the at least one action for reducing the state temperature T1 and in the event of exceeding the temperature shutdown threshold T3 to shut down the sensor unit 3.

Figure 3:
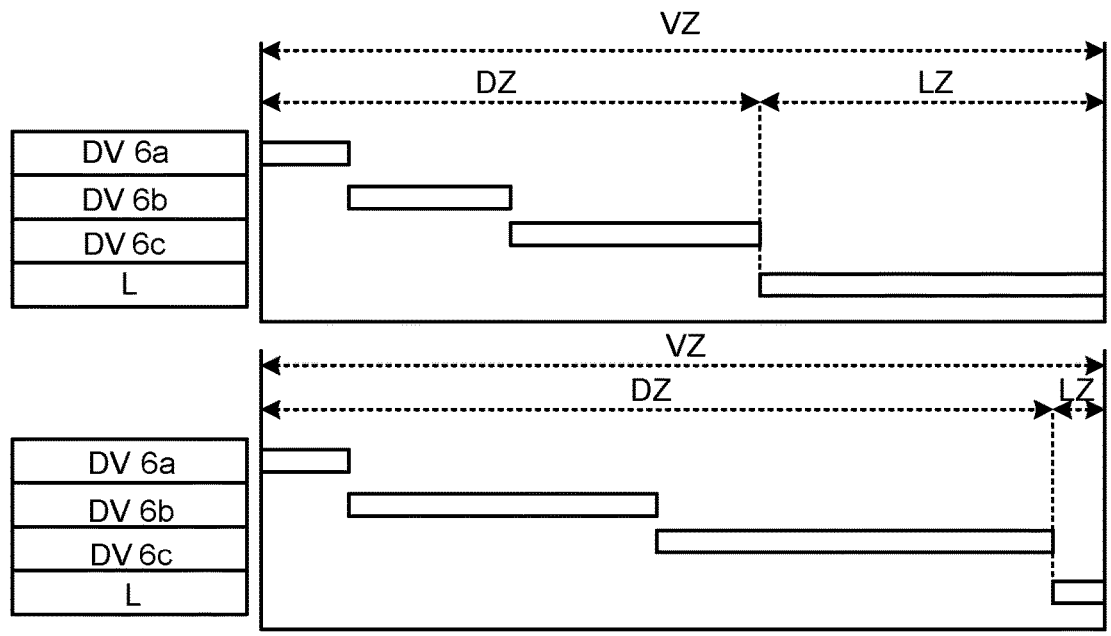
FIG. 3 shows the processing cycle of an evaluation unit of the sensor unit with a diagrammatic comparison of a higher and lower data processing effort for interpretation of environment information.

As shown in FIG. 3, the interpretation of the environment information by the evaluation unit 5, by way of example, takes place within a processing cycle VZ with a frequency of, for example, 50 ms. Purely by way of example, the interpretation of the environment information for three driver assistance devices 6a, 6b, 6c, thus for example the interpretation of lanes for a lane assist, the interpretation of traffic signs for traffic sign recognition and for interpretation of pedestrians for pedestrian protection, is shown.

Within the processing cycle VZ on the one hand the data processing for interpretation of the environment information takes place. Following the data processing DV, the evaluation unit 5 is in idle mode L until the timed processing cycle VZ has been completed. The duration of the data processing DZ is particularly dependent upon the amount of environment information to be interpreted from the sensor data, especially from the at least one image detected. In a comparison of the two diagrams shown in FIG. 3 in the top diagram, there is a lower utilization of the evaluation unit 5 during the data processing than in the bottom diagram, so that the idle time is correspondingly shortened in the bottom diagram.

Figure 5:
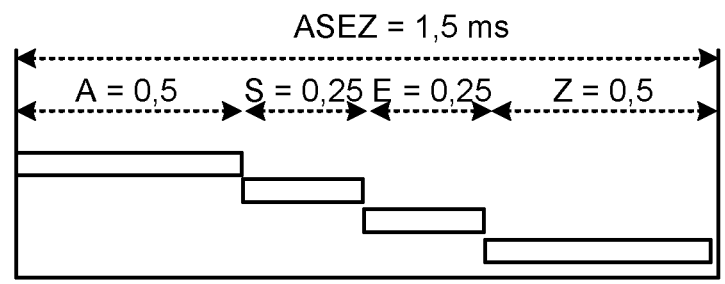
FIG. 5 shows the time required for a shutdown, saving and switch-on procedure of the evaluation unit.

It is disadvantageous that the evaluation unit 5 requires the same output during data processing DV and when idling L. In light of this, the controller 8 is, by way of example, configured, in order to reduce the state temperature T1, to shut down the evaluation unit 5 in the idle time LZ of the processing cycle VZ. This is subject, however, particularly to the time required for the shutdown, saving and switch-on procedure ASE and optionally additionally the switch-on process Z of a deactivated driver assistance device 6a, 6b, 6c of the evaluation unit 5, which is shown by way of example in FIG. 5, being less than the idle time LZ.

Figure 4:
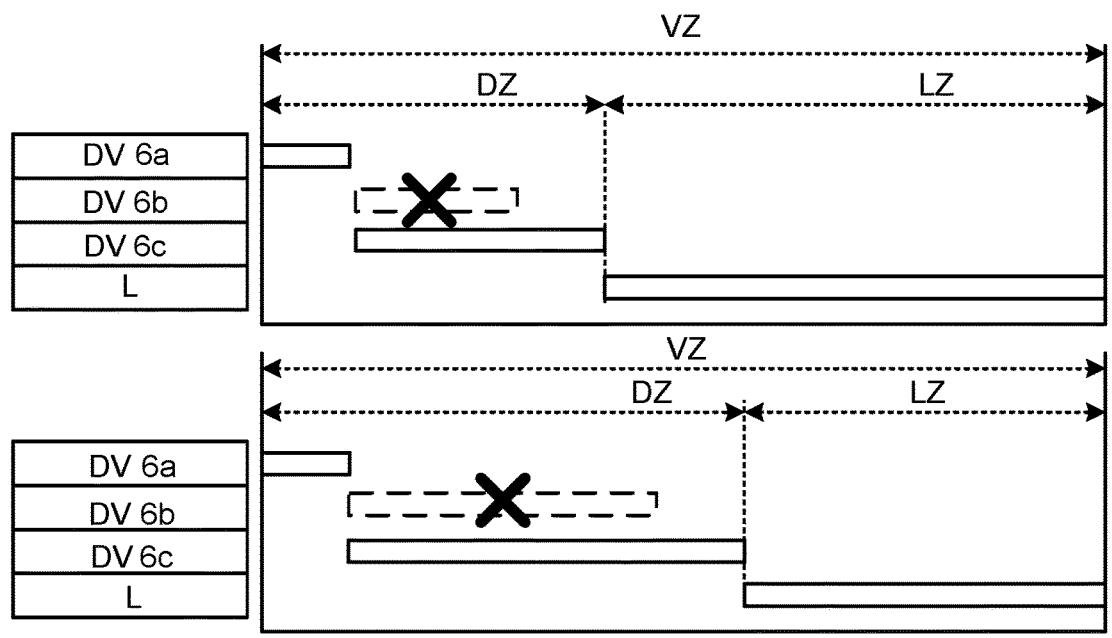
FIG. 4 shows the processing cycle with a prolonged idle time compared to FIG. 3 by shutting down a driver assistance device of the sensor unit.

To prolong the idle time LZ and thus to save the heat energy associated with the shutdown process in the idle time LZ, a further preferred action provides that at least one of the driver assistance devices 6a, 6b, 6c is deactivated. In FIG. 4, purely by way of example, the driver assistance device 6b is deactivated and thus the associated interpretation of the environment information for the driver assistance device 6b shut down. Advantageously, a longer idle time is achieved in this way, so that the associated heat and energy loss is excluded.

A calculation example is intended, by way of example, to demonstrate the potential saving of self-heating by the shutting down of at least one driver assistance device 6b and the evaluation unit 5 in the idle time LZ.

By shutting down the driver assistance device 6b, which, for example, requires a data processing time DZ of 10 ms, the idle time LZ of 10 ms increases to 25 ms. The effective time ratio for shutting down the evaluation unit 5 in the idle time LZ is according to [(idle time LZ (25 ms)−shutdown, saving, switch-on and connect process ASEZ (1.5 ms)/ processing cycle VZ (50 ms)]=0.45. The efficiency of the evaluation unit 5 is 50 percent (0.5). Since the power consumption of the evaluation unit 5 corresponds to one Watt, according to 1 Watt*0.45*0.5 this corresponds to an energy saving of 0.225 Watts. Thus, the power consumption of the evaluation unit 5 would be reduced by more than 20 percent and consequently the self-heating of the sensor unit 3 considerably.

Figure 6:
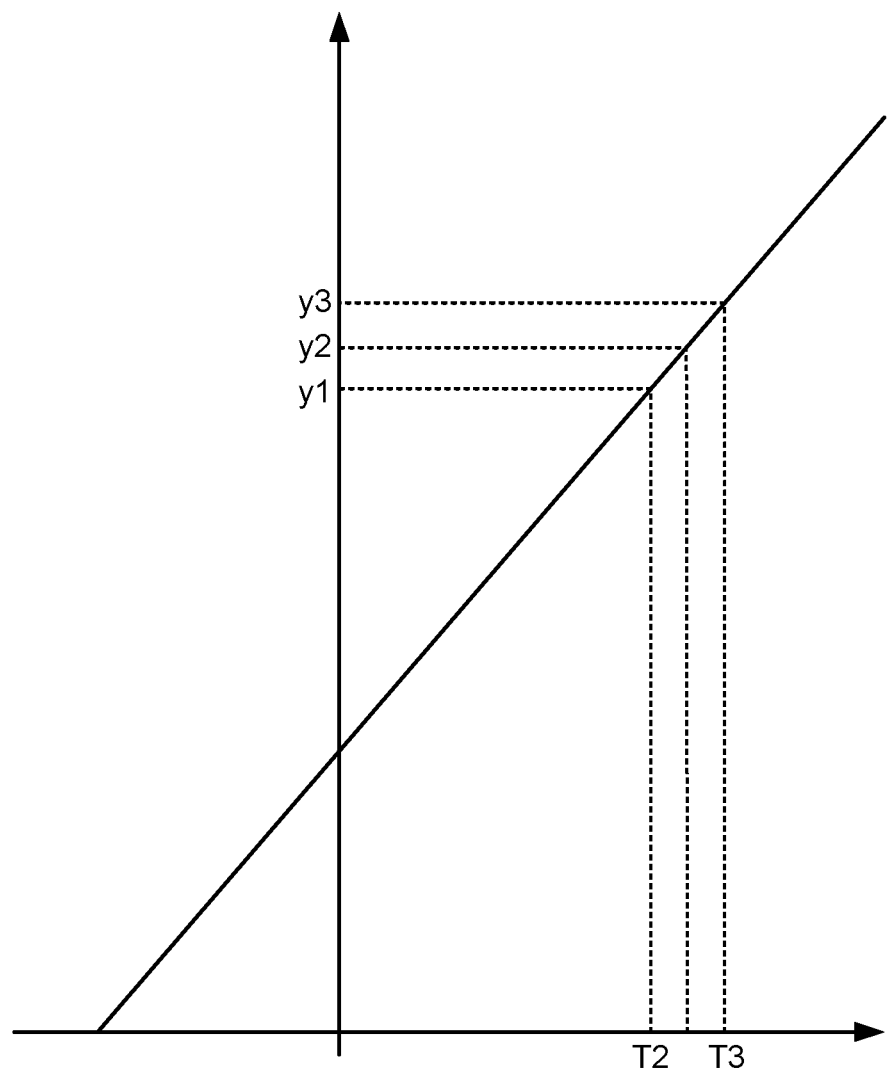
FIG. 6 is a diagram of a sequence of actions to be triggered as a function of the state temperature of the sensor unit.

FIG. 6 shows, in an overview diagram, a sequence of actions to be triggered as a function of the state temperature T1 of the sensor unit 3. The y-axis shows the inherent heating reduction actions to counter the inherent heating of the sensor unit 3 and the x-axis the associated temperature limiting values T2, T3. Purely by way of example, a linear curve is shown. In the event of the temperature warning value T2 being exceeded by the state temperature T1, by way of example, as self-heating reducing actions y1, the evaluation unit 5 shuts down in the idle time LZ, at least one driver assistance device 6a, 6b, 6c is deactivated, and the evaluation unit 5 is switched to a simplified evaluation mode with a simplified data processing algorithm, or an image resolution and/or an image recording rate of the image sensor is reduced. For y2, for example, a warning is given to the vehicle driver, that driver assistance devices 6a, 6b, 6c or the partially- or highly-automated driving mode are/is being terminated. For y3, the thermal shutdown threshold T3 has been exceeded and the sensor unit 3 or sub-assemblies of this is/are shut down by the controller 8, to prevent further heat build-up.

The invention claimed is:

1. An environment detection device for a vehicle, comprising:
a sensor unit for determining environment information of a surrounding area of the vehicle itself;
a temperature measurement unit configured to measure at least one state temperature of the sensor unit; and
a controller configured to reduce an output of at least one of the sensor unit and an electronic sub-assembly of the sensor unit without a shutdown of the sensor unit to reduce the state temperature in response to the state temperature exceeding a prescribed temperature warning value.

2. The environment detection device according to claim 1, wherein the sensor unit comprises an evaluation unit for interpreting environment information from the sensor data transmitted by the sensor unit, wherein the controller is configured, in order to reduce the state temperature, to shut down the evaluation unit in an idle time of a processing cycle in response to the time required for a shutdown, saving, and switch-on process of the evaluation unit being less than the idle time.

3. The environment detection device according to claim 1, wherein the sensor unit comprises an imaging unit, wherein the controller is configured, in order to reduce the state temperature, to reduce an image resolution, a field of view, and/or an image recording rate of at least one image to be recorded by the imaging unit.

4. The environment detection device according to claim 1, wherein the sensor unit comprises at least one driver assistance device to assist the vehicle driver, wherein the controller is configured, in order to reduce the state temperature, to deactivate the at least one driver assistance device.

5. The environment detection device according to claim 1, wherein the sensor unit comprises at least two driver assistance devices, wherein the controller is configured to carry out the deactivation of the driver assistance devices in stages according to safety requirements.

6. The environment detection device according to claim 1, wherein the controller is configured, in order to reduce the state temperature, to switch the evaluation unit to a simplified evaluation mode for interpretation of the environment information.

7. The environment detection device according to claim 1, wherein the controller is configured to trigger a speed restriction of the vehicle in response to the state temperature exceeding a prescribed temperature warning value.

8. A vehicle with an environment detection device, comprising:
a sensor unit for determining environment information of a surrounding area of the vehicle itself;
a temperature measurement unit configured to measure at least one state temperature of the sensor unit; and
a controller configured to reduce an output of the sensor unit or of electronic sub-assemblies of the sensor unit without a shutdown of the sensor unit to reduce the state temperature in response to the state temperature exceeding a prescribed temperature warning value;
wherein the controller further configured to inform the vehicle driver of the possibility of an impending shutdown process of the environment detection device, of the possibility of an impending deactivation of at least one driver assistance device, of the impending deactivation of an autonomous vehicle operation, and/or of the possibility of the impending triggering of a speed limitation, in response to the state temperature exceeding a prescribed temperature warning value.

9. A method of environment detection, comprising:
determining environment information of a surrounding area of the vehicle with a sensor unit;
measuring at least one state temperature of the sensor unit with a temperature measurement unit; and
reducing, with a controller, an output of the sensor unit or of electronic sub-assemblies of the sensor unit without a shutdown of the sensor unit to reduce the state temperature in response to the state temperature exceeding a prescribed temperature warning.

10. An environment detection device for a vehicle, comprising:
a sensor unit for determining environment information of a surrounding area of the vehicle itself;
a temperature measurement unit configured to measure at least one state temperature of the sensor unit; and
a controller configured to trigger at least one action for reducing the state temperature if a prescribed temperature warning value is exceeded;
wherein the sensor unit comprises at least two driver assistance devices, wherein the controller is configured to carry out the deactivation of the driver assistance devices in stages according to safety requirements.

* * * * *